US009223952B2

(12) United States Patent
Shippy et al.

(10) Patent No.: US 9,223,952 B2
(45) Date of Patent: Dec. 29, 2015

(54) ALLOWING VARIED DEVICE ACCESS BASED ON DIFFERENT LEVELS OF UNLOCKING MECHANISMS

(71) Applicant: Intel Corporation, Santa Clara, CA (US)

(72) Inventors: Keith Shippy, Tempe, AZ (US); Tobias Kohlenberg, Portland, OR (US); Mubashir Mian, Morton Grove, IL (US); Ned Smith, Hillsboro, OR (US); Omer Ben-Shalom, Rishon Le-Tzion (IL); Tarun Viswanathan, Folsom, CA (US); Dennis Morgan, Pine Grove, CA (US); Timothy Verrall, Pleasant Hill, CA (US); Manish Dave, Folsom, CA (US); Eran Birk, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/630,100

(22) Filed: Sep. 28, 2012

(65) Prior Publication Data

US 2014/0096178 A1    Apr. 3, 2014

(51) Int. Cl.
*G06F 17/00*     (2006.01)
*H04L 29/06*     (2006.01)
*G06F 21/31*     (2013.01)
*H04W 12/06*     (2009.01)
*H04W 88/02*     (2009.01)

(52) U.S. Cl.
CPC .............. *G06F 21/316* (2013.01); *H04W 12/06* (2013.01); *G06F 2221/2105* (2013.01); *G06F 2221/2113* (2013.01); *H04L 63/105* (2013.01); *H04L 2463/082* (2013.01); *H04W 88/02* (2013.01)

(58) Field of Classification Search
CPC ...................................... G06F 21/316
USPC ............................................. 726/1
See application file for complete search history.

(56) References Cited

U.S. PATENT DOCUMENTS

| 4,157,588 | A | * | 6/1979 | Ebihara et al. ................ 713/321 |
| 5,504,818 | A | * | 4/1996 | Okano .......................... 713/166 |
| 6,976,053 | B1 | * | 12/2005 | Tripp et al. .................... 709/202 |
| 2003/0188162 | A1 | * | 10/2003 | Candelore et al. ............. 713/169 |
| 2004/0123152 | A1 | | 6/2004 | Le Saint |
| 2005/0149907 | A1 | * | 7/2005 | Seitz et al. .................... 717/108 |

(Continued)

OTHER PUBLICATIONS

International Search Report and Written Opinion dated Dec. 27, 2013 for International Application No. PCT/US2013/059895.

(Continued)

*Primary Examiner* — Dant Shaifer Harriman
(74) *Attorney, Agent, or Firm* — Trop, Pruner & Hu, P.C.

(57) ABSTRACT

Systems and methods may provide for receiving runtime input from one or more unlock interfaces of a device and selecting a level of access with regard to the device from a plurality of levels of access based on the runtime input. The selected level of access may have an associated security policy, wherein an authentication of the runtime input may be conducted based on the associated security policy. In one example, one or more cryptographic keys are used to place the device in an unlocked state with regard to the selected level of access if the authentication is successful. If the authentication is unsuccessful, on the other hand, the device may be maintained in a locked state with regard to the selected level of access.

30 Claims, 4 Drawing Sheets

(56) References Cited

U.S. PATENT DOCUMENTS

2006/0242685 A1 10/2006 Heard et al.
2010/0189262 A1 7/2010 Ducharme et al.
2010/0199077 A1* 8/2010 Case et al. .................. 713/1
2011/0145593 A1 6/2011 Auradkar et al.
2012/0098639 A1 4/2012 Ijas

OTHER PUBLICATIONS

Dirk Balfanz, "FIDO U2F Raw Message Formats", FIDO Alliance Proposed Standard, May 14, 2015, pp. 1-10, FIDO Alliance.
Rolf Lindemann, "FIDO Security Reference", FIDO Alliance Proposed Standard, May 14, 2015, pp. 1-30, FIDO Alliance.
Dirk Balfanz, "FIDO U2F Implementation Considerations", FIDO Alliance Proposed Standard, May 14, 2015, pp. 1-5, FIDO Alliance.
Dirk Balfanz, FIDO U2F Javascript API, FIDO Alliance Proposed Standard, May 14, 2015, pp. 1-7, FIDO Alliance.
Alexei Czeskis, "FIDO NFC Protocol Specification v1.0", FIDO Alliance Proposed Standard, May 14, 2015, pp. 1-5, FIDO Alliance.
Sampath Srinivas, "Universal 2nd Factor (U2F) Overview", FIDO Alliance Proposed Standard, May 14, 2015, pp. 1-5, FIDO Alliance.
Salah Machani, et al., "FIDO UAF Review Draft Spec Set", FIDO Alliance Proposed Standard, Dec. 8, 2014, pp. 1-202.

* cited by examiner

ALLOWING VARIED DEVICE ACCESS BASED ON DIFFERENT LEVELS OF UNLOCKING MECHANISMS

BACKGROUND

Embodiments generally relate to computing device security. More particularly, embodiments relate to allowing varied device access based on different levels of unlocking mechanisms.

Certain conventional computing devices may be either locked with no applications or data being accessible or unlocked with all applications and data being fully accessible. Thus, if a user shares the device with another individual, the other individual may have access to sensitive content once the device is unlocked by the user. While certain "containerization" applications may enable data to be secured through additional passwords, etc., after the device has been unlocked, such applications may tend to be static in nature and difficult to use in device sharing scenarios.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
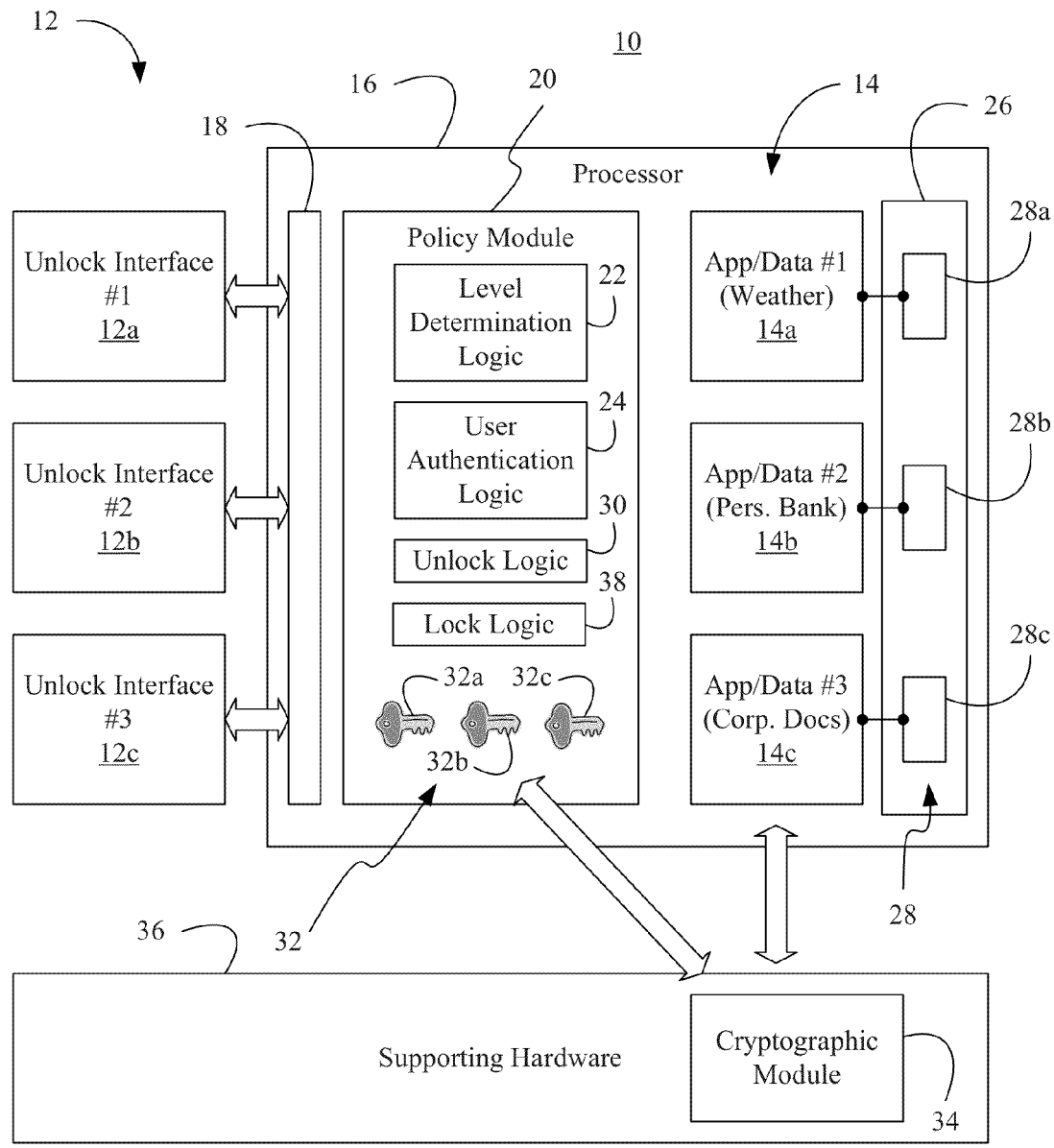
FIG. 1 is a block diagram of an example of a device according to an embodiment.

Turning now to FIG. 1, a device 10 is shown in which a plurality of unlock interfaces 12 (12a-12c) may be used to establish tiered access to content 14 (14a-14c) that is available and/or stored on the device 10. The unlock interfaces 12 might also be used to re-lock the device 10 or content 14 based on subsequent monitoring of a user's presence, gestures signaling a desire to re-lock, or a change in continuous authentication that falls below acceptable tolerance levels. The device 10 may be, for example, a desktop computer, notebook computer, personal digital assistant (PDA), mobile Internet device (MID), smart tablet, smart phone, media player, image capture device, or any combination thereof. In the illustrated example, runtime input is received from one or more of the unlock interfaces 12, wherein the runtime input may correspond to a user attempt to access the device 10.

For example, a first unlock interface 12a might be a microphone to which the user may present a voice command in order to unlock the device 10, whereas a second unlock interface may be a motion sensor (e.g., accelerometer, gyroscope) that enables the user to perform a gesture based unlocking motion such as a specific tapping or shaking pattern with/on the device 10. Similarly, a third unlock interface 12c might include a touch screen, keypad, keyboard (e.g., software or hardware), etc., that enables the user to input a passcode such as a 1-4 digit PIN (personal identification number), complex alphanumeric password, and so forth. Other types of unlock interfaces, such as location sensors (e.g., global positioning system/GPS, Wi-Fi, Bluetooth) may also be used. Furthermore, a combination of inputs from the unlock interfaces 12 can establish a higher level of security versus that achieved by a single unlock interface in isolation.

The content 14 may include different types of data and/or applications. For example first content 14a may include a weather information source, whereas second content 14b may include a personal banking web application and/or underlying banking information/cookies such as account numbers, bank login credentials, etc. Additionally, third content 14c may include highly sensitive corporate documents such as confidential communications (e.g., email, electronic files), and so forth. Rather than exposing all of the content 14 to the user whenever the device 10 is unlocked or implementing static data containers to secure the content 14, the illustrated device 10 enables varied device access based on different levels of unlocking mechanisms. In this regard, some unlock mechanisms may be relatively simple to remember and/or easy to use but may not have a high degree of security, whereas other unlock mechanisms may provide a high degree of security but may be more time consuming to input and can require more concentration to complete on the part of the user.

For example, the voice command, gesture-based and PIN-based mechanisms may be simple enough for an entire family to use. Thus, those unlock mechanisms may be used to authenticate individuals for access to the least sensitive first content 14a. The complex alphanumeric password, on the other hand might be more suitable for the owner of the device 10 only, and therefore used to authenticate users for access to the more sensitive second content 14b. Moreover, combinations of unlock mechanisms (e.g., gesture-based, PIN-based and complex alphanumeric password) could be used to authenticate individuals for access to the most sensitive third content 14c.

More particularly, the device 10, may include a processor 16 that implements a request module 18 configured to receive the runtime input from one or more of the unlock interfaces 12. The illustrated processor 16 also implements a policy module 20 having level determination logic 22 to select a level of access with regard to the device 10 from a plurality of levels of access based on the runtime input, wherein the selected level of access has an associated security policy. In one example, the level determination logic 22 compares the runtime input to metadata 26 associated with the content 14 (e.g., data and/or applications) to select the level of access. More particularly, the metadata 26 may include a plurality of policy expressions 28 (28a-28c) corresponding to the plurality of levels of access, wherein the level determination logic 22 may determine whether the runtime input satisfies one or more of the policy expressions 28.

For example, a policy representation to capture security levels where multi-factor authentication is involved could use first order Boolean logic to compose the policy. Each authentication factor type may be enumerated according to a globally unique namespace such as a GUID (globally unique identifier) or OID (object identifier) tree. In one example, a standards body may register factor types to ensure interoperability (e.g., ((GUID1 and GUID2) or (GUID1 and GUID3)). Thus, the policy expressions may be associated with the applications or data as metadata tags.

Accordingly, a first policy expression 28a might indicate that access to the first content 14a is to be granted if a correct unlock voice command is received via the first unlock interface 12a (e.g., microphone), a correct unlock gesture is detected via the second unlock interface 12b (e.g., motion sensor), or a correct unlock PIN is received via the third unlock interface 12c (e.g., touch screen, keypad, keyboard). In such a case, the level determination logic 22 may select the level of access corresponding to the first content 14a if a voice command, an unlock gesture or a PIN are detected (e.g., Boolean OR condition). A second policy expression 28b, on the other hand, may indicate that access to the second content 14b is to be granted if a correct unlock alphanumeric password is received via the third unlock interface 12c. In such a case, the level determination logic 22 may select the level of access corresponding to the second content 14b if an alphanumeric password is received. Similarly, a second policy expression 28c may indicate that access to the third content 14c is to be granted if a correct unlock gesture is detected via the second unlock interface 12b, a correct unlock PIN is received via the third unlock interface 12c, and a correct unlock alphanumeric password is received via the third unlock interface 12c. In such a case, the level of determination logic 22 may select the level of access corresponding to the third content 14c if an unlock gesture is detected, a PIN is received and an alphanumeric password is received (e.g., Boolean AND condition).

Moreover, the policy module 22 may include user authentication logic 24 to conduct an authentication of the runtime input based on the associated security policy. The associated security policy, which may identify the credentials needed to satisfy a specific unlock mechanism (e.g., voice command, PIN, alphanumeric password), can also be identified in the metadata 26. Thus, the illustrated user authentication logic 24 compares the runtime input to the associated security policy to conduct the authentication. The content 14 and metadata 26 may cryptographically bound using, for example, a digital signature (e.g., hash-based message authentication code/ HMAC and/or Rivest, Shamir, Leonard/RSA). In such a case, the user authentication logic 24 may also verify the digital signature as part of the authentication process. In general, cryptography may be used to preserve the confidentiality of the content 14, as will be discussed in greater detail. In one example, the policy module 20 and request module 18 operate in a trusted execution environment (e.g., converged security engine/CSE, manageability engine/ME, secure enclave/SE, hardware security module/HSM, secure element, or Trust-Zone). Such a trusted execution environment may be part of an embedded chipset, trusted operating system (OS) environment, and so forth.

More particularly, the policy module 20 may also include unlock logic 30 to use one or more cryptographic keys 32 (32a-32c) to place the device 10 in an unlocked state with regard to the selected level of access if the authentication is successful. Placing the device 10 in the unlocked state may involve releasing the appropriate keys 32 to a cryptographic module 34 that may reside on supporting hardware 36 such as, for example, a secure processing element. For example, if the access level corresponding to the second content 14b is selected, the unlock logic 30 may release the key 32a and the key 32b to the cryptographic module 34. When the content 14 is encrypted, the policy metadata 26 may be signed with a ciphertext so that the unlock logic 30 may interpret the policy as a condition of releasing the decryption keys 32. If, on the other hand, the authentication is unsuccessful (e.g., incorrect runtime input has been received), lock logic 38 may maintain the device 10 in a locked state with regard to the selected level of access. Moreover, the lock logic 38 may also place the device 10 in the locked state if a timeout condition is satisfied by retrieving/removing one or more of the decryption keys 32 from the cryptographic module 34. The lock logic 38 may also place the device 10 in the locked state if one or more of the unlock interfaces 12 reports a change in the user's authentication status (e.g., loss of user presence, gesture signaling a desire to lock). In one example, different levels of access are associated with different timeout conditions (e.g., time periods) to provide greater customization between the level of security and the content being accessed.

The policy module 20 may be maintained and controlled by an IT (information technology) administrator if the device 10 is being used in a corporate environment. By default, the device 10 may be unlocked to the first level of access, for example, when a user is touching an input mechanism such a touch screen, mouse movement or keyboard strike. In such a case, the desktop may appear and the user may be able to run basic tasks without the need to provide any authentication credential unless the user prefers to do so (e.g., making a phone call). On the other hand, there may be groups of applications or tasks, which if the user wants to consume them, will require credentials. The policy around the strength of the authentication and the credentials that will be used can be up to the IT system administrator to enforce. Indeed, each application group may have different authentication and credential policies.

The settings used to configure the tiered unlock behavior may be storable in a cloud for deployment or be able to be deployed as an application (e.g., .apk in Android), so the user (or IT administrator) will be able to implement the settings and framework to easily setup the device 10 even when the user changes devices and/or operating systems frequently. Such a cloud based synchronization may allow the end user to reuse simple unlock mechanisms across multiple devices while maintaining unique unlock mechanisms for accessing sensitive data that meet standard password requirements such as avoiding re-use.

Figure 2:
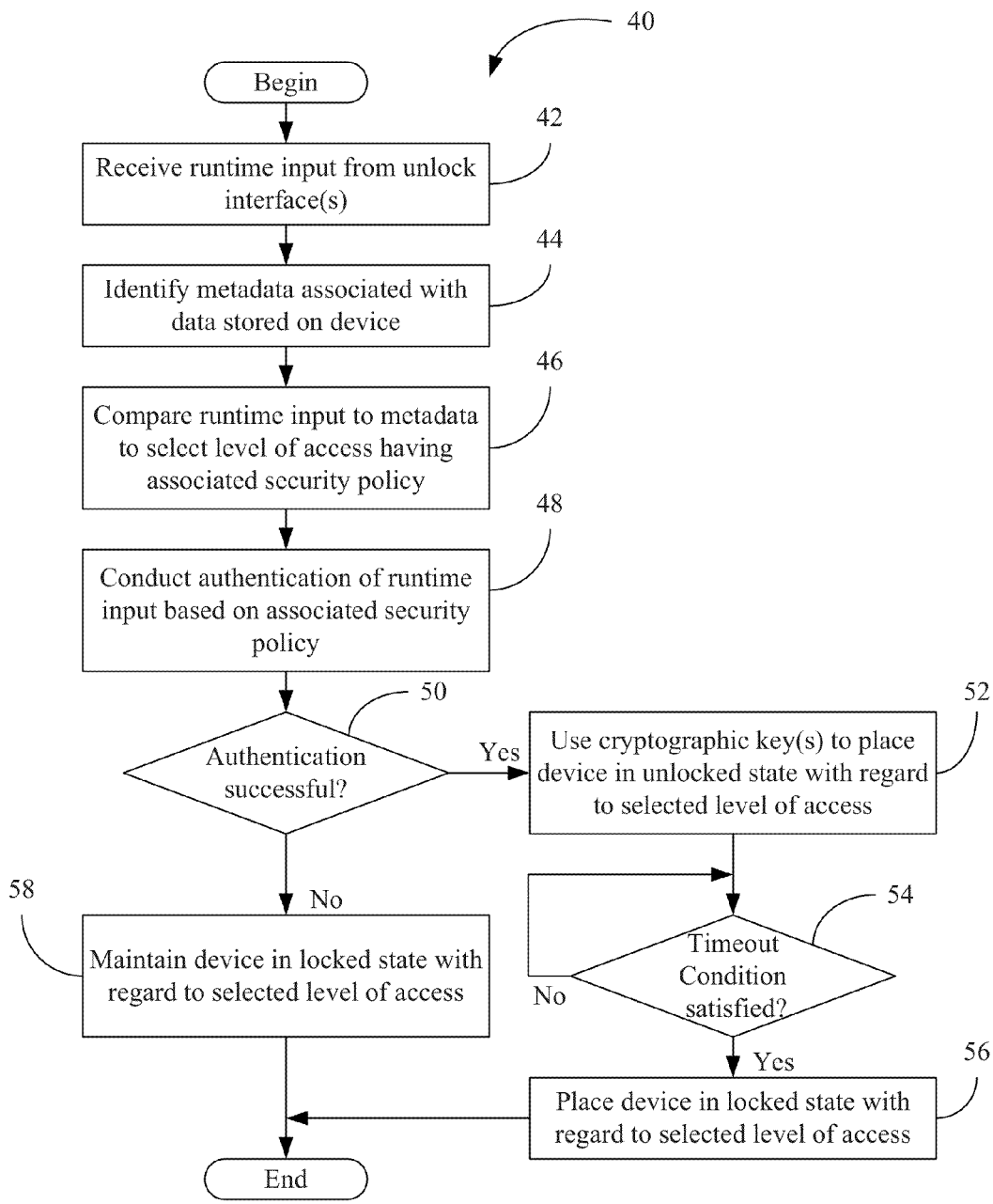
FIG. 2 is a flowchart of an example of a method of securing a computing device according to an embodiment.

Turning now to FIG. 2, a method 40 of securing a computing device is shown. The method 40 may be implemented as a set of logic instructions and/or firmware stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 40 may be written in any combination of one or more programming languages, including an object oriented programming language such as C++ or the like and conventional procedural programming languages, such as the "C" programming language or similar programming languages. Moreover, the method 40 may be implemented as the request and policy modules 18, 20 (FIG. 1) using any of the aforementioned circuit technologies.

Illustrated processing block 42 provides for receiving runtime input from one or more unlock interfaces of a device, wherein metadata associated with data stored on the device may be identified at block 44. Block 46 may compare the runtime input to the metadata to select a level of access with respect to the device from a plurality of levels of access. Additionally, an authentication of the runtime input may be conducted at block 48, wherein a determination may be made at block 50 as to whether the authentication has been successful. If so, block 52 may use one or more cryptographic keys and a cryptographic module to place the device in an unlocked state with regard to the selected level of access. In one example, placing the device in the unlocked state involves provisioning the appropriate cryptographic keys to the cryptographic module in order to decrypt the data corresponding to the selected level of access.

In addition, a determination can be made at block 54 as to whether a timeout condition has been satisfied. The timeout condition may specify, for example, a certain amount of time of inactivity on the device, wherein two or more of the plurality of levels of access may be associated with different timeout conditions. Thus, higher (e.g., more secure) levels of access might be associated shorter timeout periods than lower (e.g., less secure) levels of access, in the example shown. If the appropriate timeout condition is satisfied, illustrated block 56 provides for placing the device in a locked state with regard to the selected level of access. In one example, placing the device in the locked state involves retrieving/removing the cryptographic keys corresponding to the selected level of access from the cryptographic module. If it is determined at block 50 that the authentication has been unsuccessful, illustrated block 58 provides for maintaining the device in a locked state with regard to the selected level of access.

Figure 3:
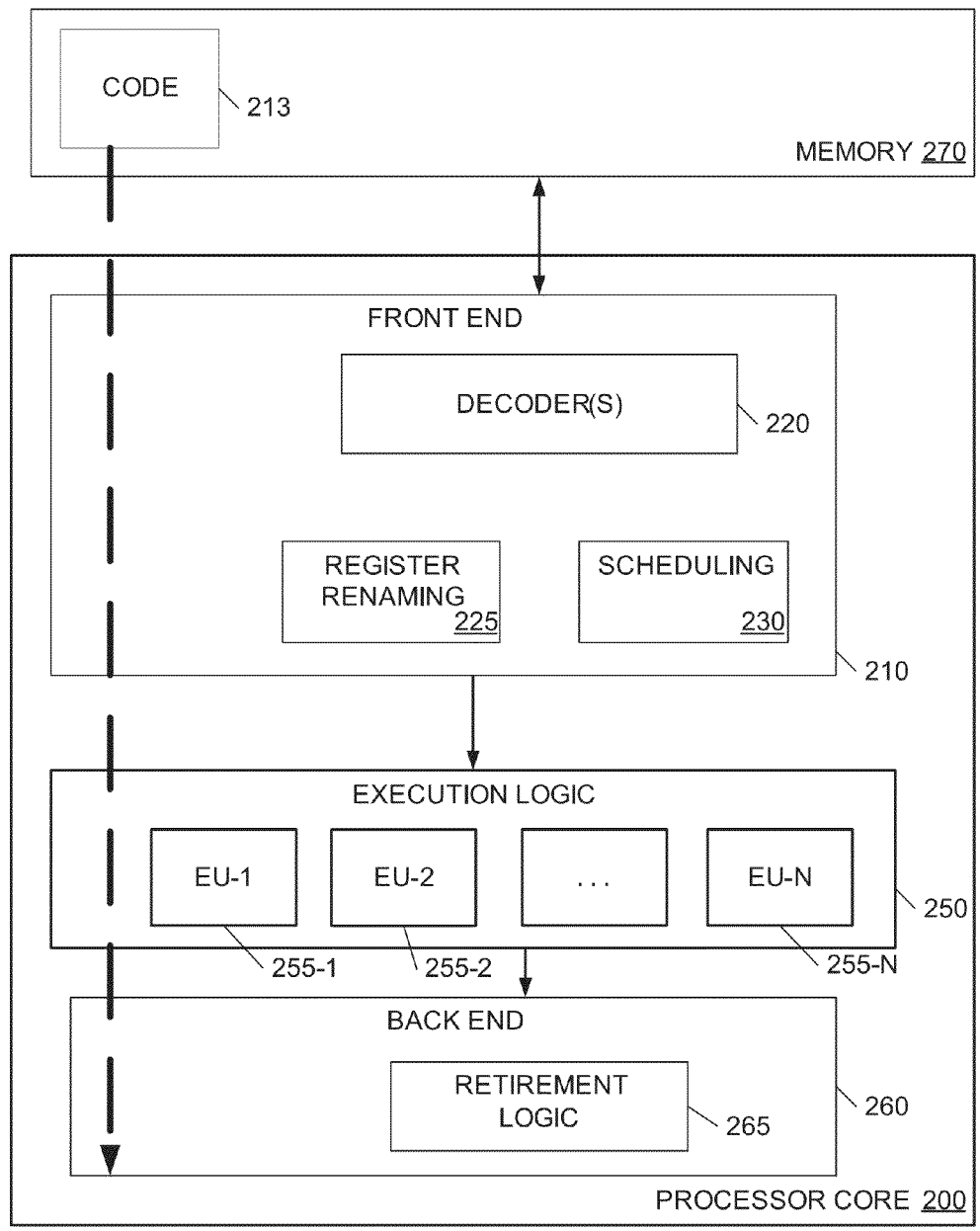
FIG. 3 is a block diagram of an example of a processor according to an embodiment.

FIG. 3 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 3, a processing element may alternatively include more than one of the processor core 200 illustrated in FIG. 3. The processor core 200 may be a single-threaded core or, for at least one embodiment, the processor core 200 may be multithreaded in that it may include more than one hardware thread context (or "logical processor") per core.

FIG. 3 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the request and policy modules 18, 20 (FIG. 1), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 3, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 4:
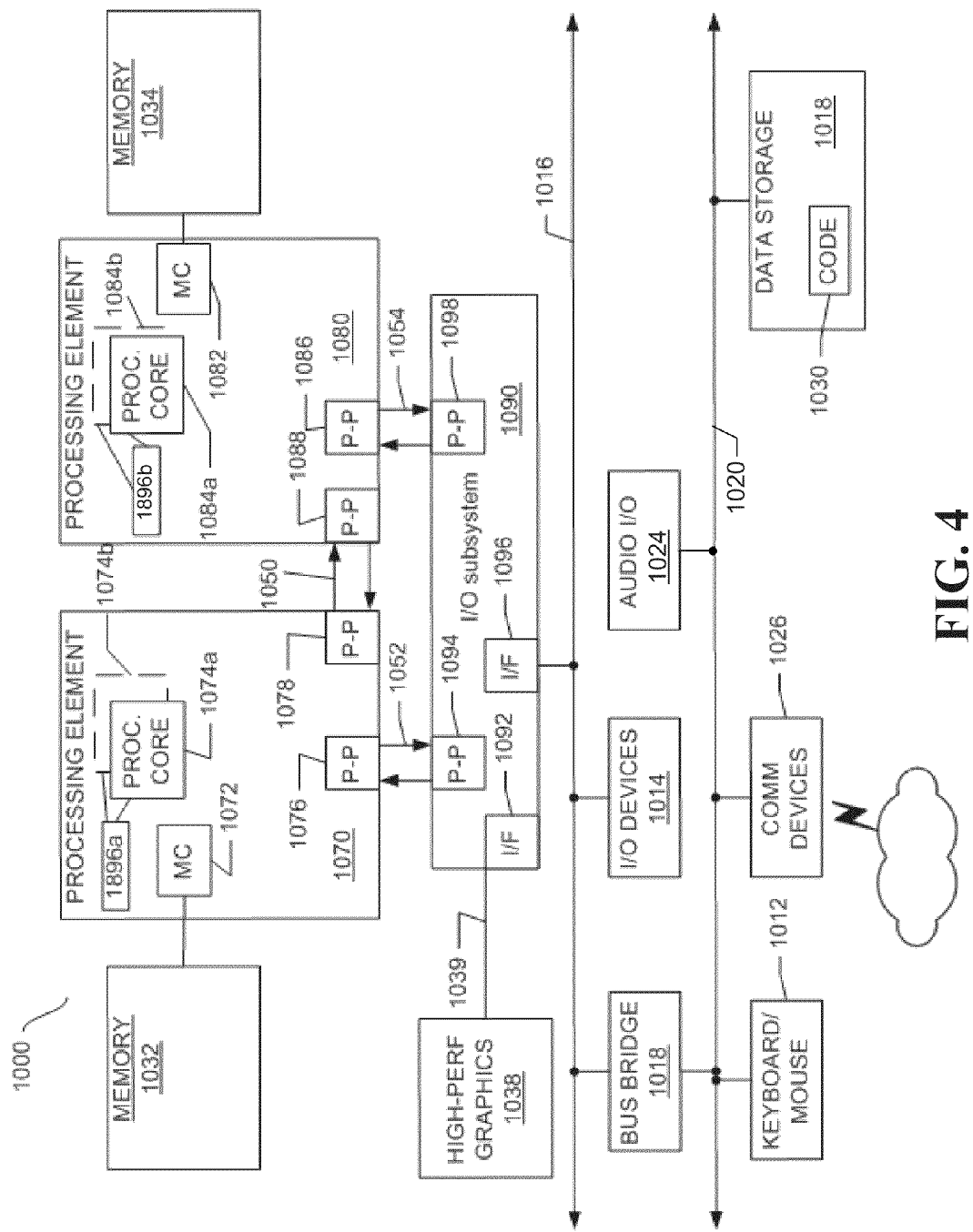
FIG. 4 is a block diagram of an example of a system according to an embodiment.

Referring now to FIG. 4, shown is a block diagram of a system 1000 in accordance with an embodiment of the present invention. Shown in FIG. 4 is a multiprocessor system 1000 that includes a first processing element 1070 and a second processing element 1080. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 4 may be implemented as a multi-drop bus rather than point-to-point interconnect.

As shown in FIG. 4, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to that discussed above in connection with FIG. 3.

Each processing element 1070, 1080 may include at least one shared cache 1896. The shared cache 1896a, 1896b may store data (e.g., instructions) that are utilized by one or more components of the processor, such as the cores 1074a, 1074b and 1084a, 1084b, respectively. For example, the shared cache may locally cache data stored in a memory 1032, 1034 (e.g., computer readable medium, computer readable storage medium, etc.) for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P)

interfaces 1076 and 1078. Similarly, second processing element 1080 may include a MC 1082 and P-P interfaces 1086 and 1088. As shown in FIG. 4, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086 and 1084, respectively. As shown in FIG. 4, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple graphics engine 1038 to I/O subsystem 1090. Alternately, a point-to-point interconnect 1039 may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the present invention is not so limited.

As shown in FIG. 4, various I/O devices 1014 may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026 (which may in turn be in communication with a computer network), and a data storage unit 1018 such as a disk drive or other mass storage device which may include code 1030, in one embodiment. The code 1030 may include instructions for performing embodiments of one or more of the methods described above. Thus, the illustrated code 1030 may implement the aforementioned request and policy modules 18, 20 (FIG. 1) and may be similar to the code 213 (FIG. 3), already discussed. Further, an audio I/O 1024 may be coupled to second bus 1020.

Note that other embodiments are contemplated. For example, instead of the point-to-point architecture of FIG. 4, a system may implement a multi-drop bus or another such communication topology. Also, the elements of FIG. 4 may alternatively be partitioned using more or fewer integrated chips than shown in FIG. 4.

Examples may therefore include an apparatus having a request module to receive runtime input from one or more unlock interfaces of a device, and a policy module with level determination logic to select a level of access with regard to the device from a plurality of levels of access based on the runtime input. The selected level of access may have an associated security policy. The policy module can also include user authentication logic to conduct an authentication of the runtime input based on the associated security policy.

Examples may also include a computer readable storage medium having a set of instructions which, if executed by a processor, cause a computer to receive runtime input from one or more unlock interfaces of a device. The instructions, if executed, may also cause a computer to select a level of access with regard to the device from a plurality of levels of access based on the runtime input, wherein the selected level of access has an associated security policy. Additionally, the instructions, if executed, can cause a computer to conduct an authentication of the runtime input based on the associated security policy.

Examples may also include a device having a plurality of unlock interfaces, wherein the plurality of unlock interfaces include one or more of a touch screen, a keypad, a keyboard, a microphone, a motion sensor and a location sensor. In addition, the device may have a request module to receive runtime input from one or more of the plurality of unlock interfaces, and a policy module with level determination logic to select a level of access with regard to the device from a plurality of levels of access based on the runtime input, wherein the selected level of access has an associated security policy. The policy module may also include user authentication logic to conduct an authentication of the runtime input based on the associated security policy.

Examples may also include a method in which runtime input is received from one or more unlock interfaces of a device, and metadata associated with data stored on the device is identified. The method can provide for comparing the runtime input to the metadata to select a level of access with regard to the device from a plurality of levels of access, wherein the selected level of access may have an associated security policy. Additionally, an authentication of the runtime input may be conducted based on the security policy, wherein one or more cryptographic keys can be used to place the device in an unlocked state with regard to the selected level of access if the authentication is successful. If the authentication is unsuccessful, on the other hand, the method may provide for maintaining the device in a locked state with regard to the selected level of access. Moreover, the device may be placed in the locked state with regard to the level of access if a timeout condition is satisfied.

Technologies described herein may therefore implement a much more dynamic method of granting access to content that can take into account the application, data, location and other contextual inputs to determine an overall sensitivity level and the unlock mechanisms required to access that combination of factors. For example, devices may be freely shared within a family (e.g., young son using father's smart phone to play games) without compromising sensitive or private applications and/or data. In addition, individuals may use devices in a more seamless and easy manner. For example, when a user only wants to access something simple, they may enter a very simple and easy to remember password or PIN or use some similar unlock mechanism. They user may not have access, however, to any sensitive applications or data after entering this simple unlock mechanism. If the user wants to access the more sensitive data or run a more sensitive application, they may be required to use an additional unlock mechanism, which might be a longer PIN or a full alphanumeric passphrase or similar higher quality unlock mechanism. Accordingly, the device (especially a mobile device like a smart phone) may be used for typical activities without having to enter a difficult or long passphrase each time the user wishes to access the device.

In addition, each locking mechanism can have a different timeout or automated relocking value in order to safeguard applications and data that require higher security while still leaving less restricted applications and data accessible. By matching the unlocking mechanism to decryption keys related to the set of applications and content to be used and by allowing dynamic determination of the device state based on the unlock mechanism and other context, the techniques described herein may enable a mix of ease of use with "just enough" security.

Moreover, techniques described herein may allow for the possibility of the entire device not being rendered unusable in the event of forgotten or mistyped credentials. Only specific applications may need to go through a password recovery process. Additionally, a "share my phone with a friend or stranger" option may be enabled in which sensitive applications and data are not put at risk. For example, sometimes family, friends or even strangers may ask to borrow a phone because theirs is unavailable or not working. Techniques described herein may enable the end user to create a specific unlock mechanism that would allow someone else to make a phone call but not have access to any other features of the phone including contact information that would otherwise have been associated with the dialing application.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate arrays (FPGAs), logic gates, registers, semiconductor devices, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds, desired level of security and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size may be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections.

In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
    receiving runtime input from one or more of a plurality of unlock interfaces of a device, wherein the plurality of unlock interfaces enable the use of runtime input related to authentication of a user;
    identifying metadata associated with data stored on the device;
    comparing the runtime input to the metadata to select a level of access with regard to the device from a plurality of levels of access, wherein different levels of access have associated security policies that specify different combinations of the plurality of unlock interfaces;
    conducting an authentication of the runtime input based on an associated security policy of the selected level of access;
    using one or more cryptographic keys to place the device in an unlocked state with regard to the selected level of access if the authentication is successful; and
    using the unlock interfaces to re-lock one or more of the device or the data stored on the device based on one or more of subsequent monitoring of a presence of the user, gestures signaling a desire to re-lock, or a change in continuous authentication that falls below acceptable tolerance levels.

2. The method of claim 1, wherein two or more of the plurality of levels of access are to be associated with different timeout conditions.

3. The method of claim 1, wherein the metadata includes a plurality of Boolean policy expressions corresponding to the plurality of levels of access, and wherein comparing the runtime input to the metadata includes determining whether the runtime input and the one or more of the plurality of unlock interfaces satisfies satisfy one or more of the plurality of policy expressions.

4. The method of claim 1, wherein the metadata and the data stored on the device are cryptographically bound with a digital signature, and the method further includes verifying the digital signature.

5. The method of claim 1, further including:
    maintaining the device in a locked state with regard to the selected level of access if the authentication is unsuccessful; and
    placing the device in the locked state with regard to the selected level of access if a timeout condition is satisfied.

6. A device comprising:
    a microprocessor;
    a plurality of unlock interfaces in communication with the microprocessor, wherein the plurality of unlock interfaces enable the use of runtime input related to authentication of a user and re-lock one or more of the device or data stored on the device based on one or more of subsequent monitoring of a presence of the user, gestures signaling a desire to re-lock, or a change in continuous authentication that falls below acceptable tolerance levels;
    a request module, in communication with the microprocessor, to receive runtime input from one or more of the plurality of unlock interfaces; and
    a policy module, in communication with the microprocessor, including,
    level determination logic to select a level of access with regard to the device from a plurality of levels of access based on the runtime input, wherein different levels of access have associated security policies that specify different combinations of the plurality of unlock interfaces, and
    user authentication logic to conduct an authentication of the runtime input based on an associated security policy of the selected level of access.

7. The device of claim 6, further including a cryptographic hardware module, wherein the policy module further includes:
    unlock logic to use one or more cryptographic keys and the cryptographic hardware module to place the device in an unlocked state with regard to the selected level of access if the authentication is successful, and
    lock logic to maintain the device in a locked state with regard to the selected level of access if the authentication is unsuccessful.

8. The device of claim 7, wherein the lock logic is to place the device in the locked state with regard to the selected level of access if a timeout condition is satisfied.

9. The device of claim 8, wherein two or more of the plurality of levels of access are associated with different timeout conditions.

10. The device of claim 6, wherein the level determination logic is to compare the runtime input to metadata associated with data stored on the device to select the level of access.

11. The device of claim 10, wherein the metadata is to include a plurality of policy expressions corresponding to the plurality of levels of access, and wherein the level determination logic is to determine whether the runtime input satisfies one or more of the plurality of policy expressions.

12. The device of claim 10, wherein the metadata and the data stored on the device are cryptographically bound with a digital signature, and wherein the user authentication logic is to verify the digital signature.

13. The device of claim 6, wherein each of the plurality of levels of access is to correspond to specific data stored on the device.

14. The device of claim 6, wherein the plurality of unlock interfaces include two or more of a touch screen, a keypad, a keyboard, a microphone, a motion sensor and a location sensor.

15. An apparatus comprising:
    a request module to receive runtime input from one or more unlock interfaces of a device, wherein the one or more unlock interfaces enable the use of runtime input related to authentication of a user and re-lock one or more of the device or data stored on the device based on one or more of subsequent monitoring of a presence of the user, gestures signaling a desire to re-lock, or a change in continuous authentication that falls below acceptable tolerance levels; and
    a policy module including,
    level determination logic to select a level of access with regard to the device from a plurality of levels of access based on the runtime input, wherein different levels of access have associated security policies that specify different combinations of the plurality of unlock interfaces, and user authentication logic to conduct an authentication of the runtime input based on an associated security policy of the selected level of access.

16. The apparatus of claim 15, wherein the policy module further includes:

unlock logic to use one or more cryptographic keys to place the device in an unlocked state with regard to the selected level of access if the authentication is successful, and lock logic to maintain the device in a locked state with regard to the selected level of access if the authentication is unsuccessful.

17. The apparatus of claim 16, wherein the lock logic is to place the device in the locked state with regard to the selected level of access if a timeout condition is satisfied.

18. The apparatus of claim 17, wherein two or more of the plurality of levels of access are associated with different timeout conditions.

19. The apparatus of claim 15, wherein the level determination logic is to compare the runtime input to metadata associated with data stored on the device to select the level of access.

20. The apparatus of claim 19, wherein the metadata is to include a plurality of policy expressions corresponding to the plurality of levels of access, and wherein the level determination logic is to determine whether the runtime input satisfies one or more of the plurality of policy expressions.

21. The apparatus of claim 19, wherein the metadata and the data stored on the device are cryptographically bound with a digital signature, and wherein the user authentication logic is to verify the digital signature.

22. The apparatus of claim 15, wherein each of the plurality of levels of access is to correspond to specific data stored on the device.

23. A non-transitory computer readable storage medium comprising a set of instructions which, if executed by a processor, cause a computer to:

receive runtime input from one or more unlock interfaces of a device, wherein the one or more unlock interfaces enable the use of runtime input related to authentication of a user and re-lock one or more of the device or data stored on the device based on one or more of subsequent monitoring of a presence of the user, gestures signaling a desire to re-lock, or a change in continuous authentication that falls below acceptable tolerance levels;

select a level of access with regard to the device from a plurality of levels of access based on the runtime input, wherein different levels of access have associated security policies that specify different combinations of the plurality of unlock interfaces; and conduct an authentication of the runtime input based on an associated security policy of the selected level of access.

24. The medium of claim 23, wherein, if executed, the instructions cause a computer to:

use one or more cryptographic keys to place the device in an unlocked state with regard to the selected level of access if the authentication is successful; and maintain the device in a locked state with regard to the selected level of access if the authentication is unsuccessful.

25. The medium of claim 24, wherein, if executed, the instructions cause a computer to place the device in the locked state with regard to the selected level of access if a timeout condition is satisfied.

26. The medium of claim 25, wherein two or more of the plurality of levels of access are associated with different timeout conditions.

27. The medium of claim 23, wherein the instructions, if executed, cause a computer to compare the runtime input to metadata associated with data stored on the device to select the level of access.

28. The medium of claim 27, wherein the metadata is to include a plurality of policy expressions corresponding to the plurality of levels of access, and wherein the instructions, if executed, cause a computer to determine whether the runtime input satisfies one or more of the plurality of policy expressions.

29. The medium of claim 27, wherein the metadata and the data stored on the device are cryptographically bound with a digital signature, and wherein the instructions, if executed, cause a computer to verify the digital signature.

30. The medium of claim 23, wherein each of the plurality of levels of access corresponds to specific data stored on the device.

* * * * *

UNITED STATES PATENT AND TRADEMARK OFFICE
CERTIFICATE OF CORRECTION

PATENT NO. : 9,223,952 B2  
APPLICATION NO. : 13/630100  
DATED : December 29, 2015  
INVENTOR(S) : Keith Shippy et al.

Page 1 of 1

It is certified that error appears in the above-identified patent and that said Letters Patent is hereby corrected as shown below:

In the Claims:  
Column 11:  
Line 48, delete "satisfies".

Signed and Sealed this  
Twenty-third Day of August, 2016

Michelle K. Lee  
*Director of the United States Patent and Trademark Office*